United States Patent
Fenn et al.

[11] Patent Number: 5,820,925
[45] Date of Patent: Oct. 13, 1998

[54] COATING PROCESS

[75] Inventors: David Robert Fenn, Burnham; Graham Stuart Kay, Stoke Poges, both of England

[73] Assignee: Imperial Chemical Industries Plc., London, England

[21] Appl. No.: 778,870

[22] Filed: Jan. 2, 1997

Related U.S. Application Data

[63] Continuation-in-part of Ser. No. 413,625, Mar. 30, 1995, abandoned.

[30] Foreign Application Priority Data

| Apr. 15, 1994 | [GB] | United Kingdom | .................. 9407495 |
| Nov. 4, 1994 | [GB] | United Kingdom | .................. 9422243 |
| Nov. 4, 1994 | [GB] | United Kingdom | .................. 9422244 |

[51] Int. Cl.$^6$ .................................. B05D 3/04; B05D 7/00
[52] U.S. Cl. ........................ 427/140; 427/142; 427/385.5
[58] Field of Search ................... 427/385.5, 140, 427/142

[56] References Cited

U.S. PATENT DOCUMENTS

| Re. 29,586 | 3/1978 | Merlino et al. | ...................... 260/830 R |
| 4,184,031 | 1/1980 | Graham | ....................................... 528/55 |
| 4,333,987 | 6/1982 | Kwart et al. | ............................. 427/520 |
| 4,696,992 | 9/1987 | Goel | ............................................. 528/90 |
| 4,730,033 | 3/1988 | Horley et al. | ............................ 528/288 |
| 4,788,083 | 11/1988 | Dammann et al. | ...................... 427/340 |
| 5,126,425 | 6/1992 | Sasagawa et al. | ......................... 528/58 |
| 5,154,950 | 10/1992 | Rosthauser et al. | ..................... 427/340 |
| 5,260,101 | 11/1993 | Larson et al. | ......................... 427/388.2 |
| 5,473,048 | 12/1995 | Sarkar | ...................................... 427/386 |
| 5,491,174 | 2/1996 | Grier et al. | ........................... 427/385.5 |

Primary Examiner—Diana Dudash
Attorney, Agent, or Firm—Thomas M. Schmitz

[57] ABSTRACT

A process for refinishing a motor vehicle by
  selecting and mixing two or more pigmented base paints from a series of master colors, each base paint having a hydroxyl functional polymer selected from the group consisting of an acrylic addition polymer, a polyester polymer and mixtures thereof, having a number average molecular weight of 600 to 10 000 and a hydroxyl value of 5 to 500, and
  adding a hardener of a polyisocyanate crosslinker to react and crosslink with said hydroxyl functional polymer in each base paint to form a thermosetting pigmented composition, the improvement in the process comprising;
  adding a catalyst mixture of a tin catalyst and a polyfunctional thiol having at least three thiol groups per molecule in which the ratio of the number of moles of thiol groups from the polyfunctional thiol to the number of moles of tin from the tin catalyst is 1:1 to 500:1, to form a catalyzed pigmented coating composition having a more constant irrespective of the pigments contained in the two or more basic paints;
  applying a layer of the catalyzed pigmented coating composition to the surface of the motor vehicle, and;
  causing the applied layer to dry and cure.

11 Claims, 4 Drawing Sheets

Difference in viscosity rise over two hours between yellow and black Paints using blending clears 2,5 and 8

COATING PROCESS

This is a continuation-in-part of U.S. application Ser. No. 08/413,625 filed on Mar. 3, 1995, now abandoned.

This invention relates to a coating process for motor vehicles using two component paints based on hydroxyl functional polymers and polyisocyanates using selected catalyst mixtures. The invention also relates to processes for the preparation of certain of the catalyst mixtures, and coating compositions containing them.

One commonly used type of coating compositions comprise a hydroxyl functional polymer and a polyisocyanate crosslinker. The compositions are applied as a layer to the surface of a substrate and either left to dry and cure at room temperature or else heated to initiate or speed the drying and curing process. During drying and curing the solvent evaporates and the hydroxyl groups on the polymer and the isocyanate groups on the crosslinker react together so as to produce a crosslinked coating film.

This type of coating composition is often used in the repair and refurbishment of motor vehicles, known as Refinishing. Refinishing is usually necessary after a vehicle has been involved in an accident or sometimes to hide the effects of age. They can also be used in the painting of commercial vehicles, for example in the livery of their owners. This use is often referred to as Commercial Transport or CT.

Refinish paints are generally supplied in the form of two components which are mixed together shortly before use. For this reason they are often called 'two pack' paints. One component, often referred to as the 'paint pack', comprises the main hydroxyl functional polymer together with any pigments, carried in an organic solvent. The other component, often referred to as the 'hardener', comprises the polyisocyanate, again usually dissolved in an organic solvent.

The two components are mixed together shortly before use because the hydroxyl functional polymer and the polyisocyanate react with each other from the moment the components are mixed. This means that the viscosity begins to rise, eventually resulting in the composition becoming unusable. The time between mixing the components together and the composition becoming unusable due to excessive viscosity is known as the potlife of the composition. Eventually, the viscosity may rise so high that the paint cannot physically be applied, but meanwhile there is a steady worsening of properties such as paint film appearance which eventually become unacceptable to the user. For this reason, when comparing the pot-life of compositions, the viscosity rise over a given period of say 2 hours is a useful yardstick to measure potlife.

Refinish paint is usually required to be an exact colour match to the original paint color on the motor vehicle applied by the manufacturer and a refinisher is generally required to be able to match any vehicle which he is required to repair. There are thousands of different colors which are either currently in use by motor vehicle manufacturers or which have been applied in the past to motor vehicles which are still on the road and which may require refinishing.

It is not feasible for the refinisher to stock all possible colors and so refinish paints are generally supplied in the form of a mixing scheme. A mixing scheme comprises a number of pigmented base paints in a small range of around 30 to 100 master colors. These base paints can be mixed together in predetermined proportions to obtain a paint pack in any desired final color. Thus, a mixing scheme is not a scheme in the sense of a method but is a term used in the Refinish art for a set of pigmented base paints.

As well as the pigmented base paints, the mixing scheme can also comprise what is known as a blending clear. A blending clear is essentially an unpigmented base paint and comprises a hydroxyl functional polymer although it can contain a different polymer from the pigmented base paints. The blending clear is added to the paint pack along with the pigmented base paints in order to achieve the desired pigment to binder ratio in the paint pack.

Generally, each mixing scheme uses one particular blending clear. The blending clear can be changed to produce final coating compositions having different properties. A set of base paints together with a set of formulations for producing the extensive range of colors required is very expensive and time consuming to produce. For this reason, the use of different blending clears to alter the properties of the final coating composition without having to alter the base paints can represent an important cost saving. For example, the use of a blending clear having a very low volatile organic content can enable a given mixing scheme to be used in countries where legislation demands a low volatile organic content in the final coating composition.

An important additional component of these coating compositions is a catalyst for the isocyanate-hydroxyl reaction. The catalyst is generally included in the paint pack either by being included in the base paints themselves or by being added as a separate component when the paint pack is made up from the appropriate base paints. The catalyst is used to speed up the curing of the coating composition and so to enable the refinisher to complete the refinish job more quickly. The presence of a catalyst also shortens the potlife of the compositions. Most refinish compositions are a delicate balance between pot-life and speed of cure. This balance is particularly difficult to achieve satisfactorily in compositions which contain a relatively low level of organic solvent, known as 'high solids' compositions.

It is advantageous to include most, or all, of the catalyst not in the pigmented base paints but either alone as a separate catalyst component of the mixing scheme or in a blending clear. This means that the catalyst levels in the final composition can be altered by using a different catalyst component or blending clear without having to reformulate all the pigmented base paints. This is useful when adapting a mixing scheme so that the compositions can be applied under unusual conditions such as high or low temperatures or humidity levels when an appropriate catalyst can be supplied in the form of, for example a "low temperature additive".

A mixing scheme is usually supplied with a set of formulations for mixing the base paints together to make certain desired final colors. The number of formulations is often very large and so they are commonly supplied in the form of a set of microfiches or, more recently, in the form of a computer database.

It is important to realise that a refinish mixing scheme is not merely a collection of paints and other components which can be mixed together. It is vitally important that the end user can mix any colored paint pack in a fixed ratio with the hardener and that the composition produced has consistent application characteristics across all colors. This means that any paint pack made from the mixing scheme has a solids content and hydroxyl content within a given range.

Each of the pigmented components of a mixing scheme contains a different pigment and these pigments are of differing densities and are dispersed using a variety of dispersing agents. It is vital that any combination of these pigmented components is stable towards flocculation and settling of the pigments and towards color changes. It is therefore important that none of the dispersed pigments interact in a manner detrimental to the stability or color of the paint pack.

U.S. Pat. No. 4,788,083 is essentially concerned with coating compositions based on hydroxyl functional polymers and polyisocyanates which contain a catalyst which can be activated by exposure to amine vapour or by heating above 50° C. The catalysts generally comprise a tin or bismuth compound used in conjunction with a mercapto compound.

Clearly, exposure to amine vapour is not a convenient means of curing a motor vehicle refinish paint. Alternatively, the requirement for heating to above 50° C. puts a severe restriction on the use of these catalysts in refinish paints because such heating requires the refinisher to have specialist ovens capable of heating a whole car. While some refinishers do possess such ovens, many do not and a composition restricted to use by refinishers having ovens would be commercially unacceptable. Ovens are unusual in the commercial transport field. A more limited range of catalysts of this type which can be used at room temperature without amine vapour with a narrow range of hydroxyl functional polymers is disclosed in European Patent Application EP-A-0 454 219.

We have discovered that there is a fundamental problem with many of the catalysts disclosed in U.S. Pat. No. 4,788,083 and EP-A-0 454 219 when they are used in a refinish mixing scheme. The problem is that the catalysts interact with certain commonly used pigments so as to give the coating compositions an unexpectedly extended or reduced potlife.

This effect is particularly noticeable with chromium based pigments such as Sicomin Yellow L1835 S (trade mark of BASF) which reduces pot-life.

The problem rests not in the fact that the potlife of the compositions is reduced per se but that pot-life varies substantially when using different combinations of pigments. This means that when complex mixtures of the base paints are made in order to reproduce a particular color, the pot-life and cure times of the final paint are unpredictable and vary widely. This means that some final colors have short pot-life and rapid curing and others long pot-life and slow curing. As far as the end user is concerned the potlife and speed of cure appear to be subject to random variation across the color range. Such variation is unacceptable for refinishers who require a predictable product.

We have discovered that these problems can be reduced or overcome by a coating process which involves coating compositions containing certain selected catalysts of the type generally disclosed in U.S. Pat. No. 4,788,083. Selected catalysts unexpectedly behave in a much more consistent way with the various pigments and so reduce or overcome the pot-life variability problems associated with the selection of different pigmented master colors by the refinisher, outlined above.

The benefit of these selected catalysts lies not in a general extension or improvement in the pot-life of a given composition but in the improved consistency of pot-life time across a wide range of colors leading to a more predictable and reproducible process irrespective of the color of the paint. In essence the pot-life is much more constant regardless of the pigmentation.

Accordingly, the present invention provides a process for refinishing a motor vehicle by selecting and mixing two or more pigmented base paints from a series of master colors, each base paint having a hydroxyl functional polymer selected from the group consisting of an acrylic addition polymer, a polyester polymer and mixtures thereof, having a number average molecular weight of 600 to 10 000 and a hydroxyl value of 5 to 500, and adding a hardener of a polyisocyanate crosslinker to react and crosslink with said hydroxyl functional polymer in each base paint to form a thermosetting pigmented composition, the improvement in the process comprising;

adding a catalyst mixture of a tin catalyst and a polyfunctional thiol having at least three thiol groups per molecule in which the ratio of the number of moles of thiol groups from the polyfunctional thiol to the number of moles of tin from the tin catalyst is 1:1 to 500:1, to form a catalysed pigmented coating composition having a more constant potlife irrespective of the pigments contained in the two or more basic paints;

applying a layer of the catalysed pigmented coating composition to the surface of the motor vehicle, and;

causing the applied layer to dry and cure.

In accordance with this invention, one or both of the tin catalyst and the polyfunctional thiol can be included in a blending clear or can be separate components of the mixing scheme. Preferably the tin catalyst and polyfunctional thiol are present together as a catalyst mixture, either as a separate component or included in a blending clear. As explained above, a blending clear is an unpigmented composition containing a hydroxyl functional polymer. The catalyst mixture can be made by mixing the tin catalyst and the polyfunctional thiol together. The catalyst mixture can be included in the blending clear by mixing the tin catalyst and the polyfunctional thiol with the blending clear either sequentially or simultaneously.

Tin catalysts are well known in the art for the catalysis of the reaction between isocyanate groups and hydroxyl groups. Examples of tin catalysts include alkyl, aryl and acyl compounds of tin, such as stannous octoate, as well as tin oxide, mercaptides and halides such as stannous chloride and stannic chloride. Examples of tin catalysts also include tin compounds with a combination of these groups such as dialkyl tin diacylates such as dibutyl tin dilaurate, dialkyl tin dimercaptides such as dibutyl tin dilaurylmercaptide and dialkyl tin dihalides such as dibutyl tin dichloride. Mixtures of any of these compounds can also be used.

Preferred tin catalysts are tin mercaptides. It has been found that the specific use of tin mercaptides gives rise to an additional benefit of an improved rate of curing of the compositions without any reduction in potlife. The improved rate of curing is particularly noticeable in the early stages of curing for example in improved 'dust-free' times, i.e. the time after application when dust no longer sticks to the surface of the paint.

Tin mercaptides are compounds having a tin atom covalently bonded to a sulphur atom. There can be 1 to 4 sulphur atoms covalently bonded to each tin atom, preferably there are two sulphur atoms bonded to each tin atom. Preferred tin mercaptides can be represented by the general formula;

$$Sn(S-R')_a R_4$$

in which a is 1 to 4, preferably 2, R which can be the same or different, are $C_{1-10}$ alkyl, preferably $C_{4-8}$ alkyl such as butyl or octyl, and R' which can be the same or different, are alkyl optionally carrying an ester group. Examples of suitable alkyl groups are $C_{1-10}$ straight chain or branched alkyl, such as methyl, ethyl, n-propyl, isopropyl, n-butyl, isobutyl, n-hexyl, 2-ethyl hexyl, n-octyl and isooctyl. Examples of alkyl groups carrying an ester group are groups of the formula —$CH_2$—$(R^2)$—$COOR^3$ in which $R^2$ is a $c_{1-5}$ alkylene chain or can be omitted and $R^3$ is a $C_{1-10}$ branched or straight chain alkyl group such as methyl, ethyl, isobutyl, 2-ethyl hexyl, n-octyl or iso-octyl.

Many such tin mercaptides are commercially available, for example under the Stanclere trade mark from Akzo, such as Stanclere T482, T473, T582, T483, T182, T163, under the DABCO trade mark from Air Products, such as DABCO T1403 and under the Irgastab trade mark from Ciba Geigy, such as Irgastab 17M which is a preferred tin mercaptide.

Preferably in the coating composition, the tin catalyst is present in an amount 0.001 to 3% by weight based on the total weight of hydroxyl functional polymer and more preferably 0.005 to 2% by weight.

Preferred polyfunctional thiols have at least four thiol groups per molecule, more preferably 4 to 8 thiol groups and most preferably 4 thiol groups. Preferred polyfunctional thiols have a thiol equivalent weight of at least 50, more preferably 50 to 300 and most preferably 75 to 150. Examples of suitable thiols include pentaerythritol tetra-(3-mercaptopropionate), pentaerythritol tetra-(3-mercaptoacetate), trimethylol propane trithioglycolate and trimethylol propane tri(3-mercapto propionate). Pentaerythritol tetra-(3-mercapto acylates) such as pentaerythritol tetra-(3-mercapto acetate) or pentaerythritol tetra-(3-mercaptopropionate) are preferred.

Preferably the ratio of the number of moles of thiol groups from the polyfunctional thiol to the number of moles of tin from the tin catalyst in the coating compositions is 1:1 to 100:1, and more preferably 3:1 to 50:1.

The hydroxy functional polymer in the blending clear and in the pigmented base paints can be the same or different and can comprise a mixture of different polymers. Preferred hydroxyl functional polymers have a number average molecular weight as measured by gel permeation chromatography of 600 to 10 000, more preferably 1 000 to 4 000. Preferably the hydroxyl functional polymer has a hydroxyl value of 5 to 500, more preferably 50 to 250.

The hydroxyl functional polymer can be any hydroxyl functional film-forming polymer and many suitable hydroxyl functional polymers are commercially available. Preferred hydroxyl functional polymers are hydroxyl functional acrylic addition polymers and hydroxyl functional polyesters or mixtures of these.

Hydroxyl functional acrylic addition polymers are derived from polymerisable ethylenically unsaturated monomers such as vinyl or acrylic monomers and comprise functional units and structural units.

Whenever referred to herein, the term acrylic monomer refers to esters of acrylic or methacrylic acid. The term (meth) acrylate refers to both the acrylate and methacrylate equally and the term (meth) acrylic acid refers to acrylic or methacrylic acid equally.

Functional units are derived from hydroxyl functional vinyl or acrylic monomers. An example of a hydroxyl functional vinyl monomer is vinyl alcohol. Examples of hydroxyl functional acrylic monomers are hydroxy ethyl (meth) acrylate, hydroxy butyl (meth) acrylate and hydroxy propyl (meth) acrylate. A preferred hydroxyl functional monomer is 4-hydroxybutyl acrylate.

Other examples of suitable hydroxyl functional monomers are the reaction products of glycidyl (meth) acrylate with mono-carboxylic acids, such as versatic acid and the reaction product of (meth) acrylic acid with monoepoxy compounds such as Cardura E (glycidyl ester of versatic acid; trade mark of Shell).

Structural units are derived from monomers which do not have any functional groups which will react with the crosslinker. Examples of monomers which do not have any functional group which will react with the crosslinker are non-functional vinyl monomers and alkyl esters of (meth) acrylic acid.

Examples of suitable non-functional vinyl monomers are styrene tertiary butyl styrene and alpha methyl styrene, preferably alpha methyl styrene. Examples of suitable alkyl esters of (meth) acrylic acid are $C_{1-12}$ alkyl esters such as methyl (meth) acrylate, ethyl (meth) acrylate, n-butyl (meth) acrylate, t-butyl (meth) acrylate, n-propyl (meth) acrylate and isobornyl (meth)acrylate, preferably isobornyl methacrylate.

Monomers which carry groups other than hydroxyl groups, such as carboxylic acid groups, amine groups and epoxy groups can also be included. An example of a monomer carrying a carboxylic acid group is (meth) acrylic acid. An example of a monomer carrying an amine groups is tertiary-butyl aminoethyl (meth) acrylate. An example of a monomer carrying a glycidyl group is glycidyl (meth) acrylate.

Certain functional groups can be reacted with other compounds so as to modify the polymer. For example, acid groups on the polymer can be reacted with glycidyl functional compounds such as the glycidyl ester of versatic acid (Cardura E from Shell) and epoxy groups on the polymer can be reacted with an acid functional compound, for example versatic acid.

The acrylic addition polymers can also contain units derived from chain transfer agents. Chain transfer agents are compounds which are used in the manufacture of acrylic addition polymers to control their molecular weight. Examples of known chain terminating agents include mercapto functional compounds. Examples of suitable mercapto functional compounds are alkyl mercaptans, such as primary octyl mercaptan, hydroxyalkyl mercaptans, such as mercaptoethanol and mercaptoalkanoic acids such as mercaptopropionic acid. A particularly preferred class of chain transfer agents are mercaptoalkanoic acids. A particularly preferred mercapto alkanoic acid is mercapto propionic acid.

Preferred acrylic addition polymers have a theoretical glass transition temperature (Fox Tg) of 0° to 80° C., more preferably 20° to 70° C.

The hydroxyl functional acrylic addition polymer can be produced conventionally by contacting a mixture of the appropriate monomers and any chain transfer agent with a polymerisation initiator at a temperature at which polymerisation occurs. For example the monomer mixture can be slowly fed into a solution of initiator held at the polymerisation temperature or the initiator can be fed into a solvent at the polymerisation temperature simultaneously with the monomer mixture.

Suitable initiators are azo initiators such as 2,2' azobis (2-methylbutyronitrile) or peroxy initiators such as benzoyl peroxide.

Hydroxyl functional polyester polymers have units derived from one or more polybasic acids and units derived from one or more polyhydroxy compounds. Polybasic acids are compounds having two or more carboxylic acid groups or an equivalent number of anhydride groups (on the basis that one anhydride group is equivalent to two acid groups). Such polybasic acids are well known in the polyester art. Examples of suitable polybasic acids are $C_{1-6}$ alkane dioic acids such as adipic acid or hexanedioic acid, cycloaliphatic acids such as hexahydrophthalic acid, unsaturated alkane dioic acids such as fumaric or maleic acids, dimer acids, and aromatic acids such as phthalic acid. Their equivalent anhydrides such as maleic anhydride or phthalic anhydride can also be used. Preferably the polybasic acids are saturated.

Polyhydroxy compounds are compounds having two or more hydroxyl groups and are well known in the polyester art. Examples of suitable polyhydroxy compounds are trimethylol propane, glycerol, neopentyl glycol and pentaerythritol.

The hydroxyl functional polyester polymer can be produced conventionally by melting together the components of the polyester. Alternatively the components can be dissolved in a suitable solvent. The melt or solution is then heated so as to remove any water produced in the reaction, for example by azeotropic distillation using a Dean and Stark apparatus.

The pigments can be any pigments useful for refinish paints, and an enormous number are known and used. Examples of suitable pigments include Sicomin Yellow L1835 S, and Sicomin Red L3035 S (trade marks of BASF), Polomar Blue B-4808 (trade mark of Miles Corporation) and Monolite Red 2Y (trade mark of Zeneca Colors). The majority of base paints and paint packs comprise a complex mixture of pigments so as to give the desired color.

The pigmented base paints and the blending clear, can also contain other conventional paint additives such as reactive diluents, UV absorbers and flow aids. The pigmented base paints can also contain fillers.

The catalyst mixture, when it is present as a separate component, the base paints and the blending clear can also comprise a volatile organic solvent. The volatile organic solvent can be any solvent in which the various components can be dissolved or dispersed, preferably one which dissolves the hydroxy functional polymer. It can be an aliphatic or aromatic hydrocarbon such as Solvesso 100 (trademark), toluene or xylene, an alcohol such as butanol or isopropanol, an ester such as butyl acetate or ethyl acetate, a ketone such as acetone, methyl isobutyl ketone or methyl ethyl ketone, an ether, an ether-alcohol or an ether-ester or a mixture of any of these.

Preferably the base paints are selected from a refinish mixing scheme. Preferably the mixing scheme comprises about 10 to 100 pigmented base paints, more preferably about 20 to 50. The selection of base paints and their ratios is preferably made according to one of a number of predetermined formulations supplied as part of the mixing scheme.

Preferably a paint pack comprises less than 50% by weight of solvent, more preferably less than 40% and most preferably less than 35%.

Polyisocyanates are well known in the coatings art and are compounds having two or more isocyanate groups per molecule. The isocyanate groups are not blocked.

Suitable diisocyanates are aliphatic or aromatic diisocyanates. Examples of suitable aliphatic diisocyanates are hexamethylene diisocyanate and isophorone diisocyanate.

Examples of suitable aromatic diisocyanates are toluene diisocyanate and 4,4'-diphenylmethane diisocyanate.

Other suitable polyisocyanates include the isocyanurate trimers, allophanates and uretdiones of diisocyanates such as those described above as well as the reaction products of these diisocyanates with polyols. Polyols are compounds having three or more hydroxyl groups. Suitable polyols include trimethylol propane, glycerol and pentaerythritol. Many such poly isocyanates are commercially available, for example under the Desmodur trade mark from Bayer or the Tolonate trade mark from Rhone Poulenc, such as Tolonate HD90.

Polyisocyanates are preferably used in an amount such that the ratio of isocyanate groups from the polyisocyanate to the total number of hydroxyl groups from the hydroxyl functional polymer in the paint pack is in the range 0.8 to 1.4, more preferably 0.9 to 1.1.

The hardener usually also comprises a volatile organic solvent for the polyisocyanate. The volatile organic solvent can be any of those mentioned above in relation to the catalyst mixture, blending clear and pigmented base paints. Preferably the hardener comprises less than 40% volatile organic solvent. The hardener can also comprise a water scavenger.

As well as any volatile organic solvent from the paint pack and the hardener, the final coating composition can also comprise additional organic solvent. The organic solvent can be any of those mentioned above in relation to the catalyst mixture, blending clear and pigmented base paints. Additional organic solvent can be added to the coating composition to reduce the viscosity, and so improve the application properties, particularly when the composition is applied by spraying.

Preferably the coating composition contains less than 600 g/l of volatile organic solvent in total, more preferably less than 500 g/l and most preferably less than 400 g/l. The content of organic solvent can be determined by firstly measuring the density of the coating composition at 25° C. and then determining the proportion of organic solvent on a weight basis. This is done by heating an accurately weighed sample of about 0.3 g of composition in an oven preheated to 110° C. for 1 hour, reweighing and calculating the weight of solvent which is lost by subtraction. The proportion by weight of organic solvent can be converted to a proportion on a volume basis in g/l by multiplying by the density of the composition in g/l.

The mixing of the pigmented bases and any blending clear, catalyst mixture and polyisocyanate can be carried out by stirring or shaking the components together, either by hand or by using a mechanical stirrer or shaker.

The coating composition can be applied to the surface of the motor vehicle by conventional means such as brushing, rollercoating or spraying, preferably by spraying.

Motor vehicles are conventionally made largely of steel sheet but can also comprise aluminium sheet and often comprise at least a proportion of moulded plastic components. The compositions are usually applied over one of more layers of primer or undercoat.

The applied layer can be allowed to dry and cure at ambient temperature or alternatively the layer can be baked at elevated temperatures, for example 50°–120° C. for 5 to 120 minutes to accelerate drying and curing. During drying and curing the solvent evaporates and the hydroxyl groups on the polymer and the isocyanate groups on the crosslinker react together so as to produce a crosslinked coating film.

According to the present invention there is also provided a coated motor vehicle obtainable by the process.

The invention is illustrated by the following examples.

EXAMPLES

Coating compositions were made comprising a pigmented base paint, a polyisocyanate hardener, a thinner and a blending clear containing various catalysts. The pigmented base paint comprised hydroxyl functional polymers and various pigments. Two base paints were made using commercially available mixing basics, a yellow base paint containing a chrome based pigment and a black base paint containing a carbon based pigment.

The blending clears contained a hydroxy functional acrylic addition polymer, various catalyst mixtures and other additives. The catalyst mixtures were either a two functional thiol, a three functional thiol or a four functional thiol in combination with a commercially available tin mercaptide catalyst.

The viscosity of the catalysed compositions was measured both initially and after 2 hours at 25° C. in order to compare their pot-life performance.

1 Hardener Formulation
The following components were mixed (by weight %);
Xylene 9.34
Solvesso 100 aromatic hydrocarbon solvent from Exxon 9.34
Tolonate HDT 90 polyisocyanate from Rhone Poulenc 66.47

2 Thinner Formulation
The following components were mixed (by weight %);
Butyl acetate 35
Solvesso 100 25
1-methoxy-2-propanol acetate 25
Xylene 10
Methyl isobutyl ketone 5

3. Yellow Base Paint
The yellow base paint was a color called Golden Yellow made from the following components which are all commercially available from Imperial Chemical Industries Plc in their Turbo Plus mixing scheme. The pigmentation is largely chrome based.
P 488-942 39.0 g
P 488-951 102.0 g
P 488-964 2829.0 g
P 488-982 30.0 g 4. Black Base Paint
The black base paint was a color called Raven Black made from the following components which are all commercially available from Imperial Chemical Industries Plc in their Turbo Plus mixing scheme. The pigmentation is largely carbon based.
P 425-957 189.54 g
P 488-951 773.45 g
P 488-981 2037.02 g 5. Preparation of hydroxyl functional acrylic addition polymer
Methyl isoamyl ketone (613 g) was heated to reflux temperature (about 145° C.) with stirring under nitrogen. A mixture of methyl methacrylate (618.4 g), butyl acrylate (434.8 g), hydroxy ethyl methacrylate (507 g), styrene (390 g), Vazo 67 (2,2-azobis-(2-methylbutyronitrile), trade mark of duPont 97.5 g), primary octyl mercaptan (97.5 g) and methyl isoamyl ketone (235 g) were added slowly to the refluxing mixture over a period of 3 hours. Trigonox 21s (butyl peroxy-2-ethyl hexanoate, trade mark of Akzo, 3.4 g) was added and the mixture was stirred at reflux temperature for a further hour. Trigonox 21s (3.4 g) was added, the mixture was stirred at reflux temperature for a further hour and the mixture was allowed to cool to room temperature. The resulting hydroxyl functional acrylic addition polymer had a calculated glass transition temperature (Fox Tg) of 40° C., a hydroxyl value of 112 mgKOH/g based on non-volatile content and had a non-volatile content of 70%.

6 Preparation of Blending Clears 1 to 9
Blending clears 1 to 9 were made by mixing the hydroxyl functional acrylic addition polymer from 6 above with tin mercaptide catalyst (50% weight solution in methyl isobutyl ketone of Irgastab 17M) and a thiol. Blending clears 1 to 3 contain pentaerythritol tetramercaptopropionate (Tetra thiol), blending clears 4 to 6 contain trimethylol propane trimercaptopropionate (Trithiol) and blending clears 7 to 9 contain ethylene glycol dimercaptopropionate (Dithiol). Within each set, the weight ratio of the tin catalyst solution to the thiol is 3:2, 1:2 and 1:3. All figures are by weight %.

6.1 Blending Clear 1
Polymer 97.06
Byk 306 0.40 (Flow aid, from Byk)
Baysilone OL31 0.40 (Flow aid, from Bayer)
Irgastab 17M soln. 0.45
Tetrathiol 0.30
Solvesso 100 1.39

6.2 Blending Clear 2
Polymer 97.06
Byk 306 0.40
Baysilone OL31 0.40
Irgastab 17M soln. 0.15
Tetrathiol 0.30
Solvesso 100 1.69

6.3 Blending Clear 3
Polymer 97.06
Byk 306 0.40
Baysilone OL31 0.40
Irgastab 17M soln. 0.15
Tetrathiol 0.45
Solvesso 100 1.54

6.4 Blending Clear 4
Polymer 97.06
Byk 306 0.40
Baysilone OL31 0.40
Irgastab 17M soln. 0.45
Trithiol 0.33
Solvesso 100 1.36

6.5 Blending Clear 5
Polymer 97.06
Byk 306 0.40
Baysilone OL31 0.40
Irgastab 17M soln. 0.15
Trithiol 0.33
Solvesso 100 1.66

6.6 Blending Clear 6
Polymer 97.06
Byk 306 0.40

Baysilone OL31 0.40
Irgastab 17M soln. 0.15
Trithiol 0.30
Solvesso 100 1.39
6.7 Blending Clear 7
Polymer 97.06
Byk 306 0.40
Baysilone OL31 0.40
Irgastab 17M soln. 0.45
Dithiol 0.30
Solvesso 100 1.39
6.8 Blending Clear 8
Polymer 97.06
Byk 306 0.40
Baysilone OL31 0.40
Irgastab 17M soln. 0.15
Dithiol 0.30
Solvesso 100 1.69
6.9 Blending Clear 9
Polymer 97.06
Byk 306 0.40
Baysilone OL31 0.40
Irgastab 17M soln. 0.15
Dithiol 0.45
Solvesso 100 1.54

7 Final coating compositions

The coating compositions were made by firstly mixing the colored base paint and each of the blending clears 1 to 9 in a weight ratio of blending clear to base paint of 30.1:69.9 for the yellow paints and 39.5:60.5 for the black paints. Then these mixtures were mixed with hardener and thinner. For the yellow paints, the colored base paint/blending clear mixture, hardener and thinner were mixed in a 100:22.1:18.6 weight ratio. For the black paints, the colored base paint/blending clear mixture, hardener and thinner were mixed in a 100:25.88:18.6 weight ratio.

The initial viscosity of all the compositions was 30 s BS B4 cup. The viscosity rise after 2 h of the various compositions are given in Table 1 below, measured in seconds in a BS B4 cup.

TABLE 1

|  | Blending Clear | Viscosity rise after 2 h |
|---|---|---|
| Yellow Paints | 1 | 37 |
|  | 2 | 12 |
|  | 3 | 10 |
|  | 4 | 47 |
|  | 5 | 17 |
|  | 6 | 13 |
|  | 7 | 90 |
|  | 8 | 27 |
|  | 9 | 24 |
| Black Paints | 1 | 7 |
|  | 2 | 6 |
|  | 3 | 5 |
|  | 4 | 6 |
|  | 5 | 5 |
|  | 6 | 5 |
|  | 7 | 5 |
|  | 8 | 6 |
|  | 9 | 6 |

Figure 1:
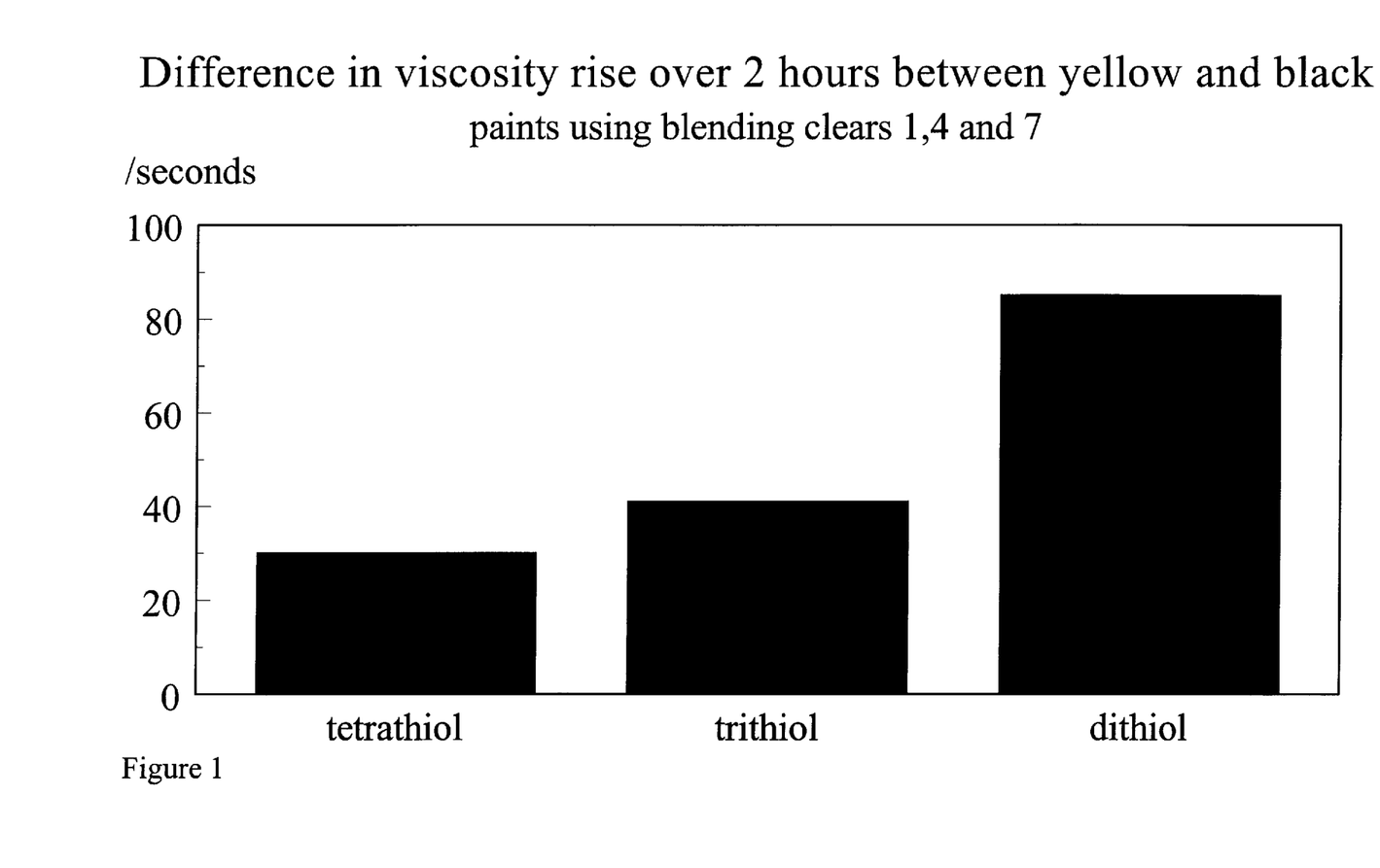
FIG. 1 is a bar graph indicating the difference in viscosity rise over 2 hours between yellow and black paints as a function of thiol catalyst functionality, in compositions with a weight ratio of tin catalyst solution to thiol of 3:2.
Figure 2:
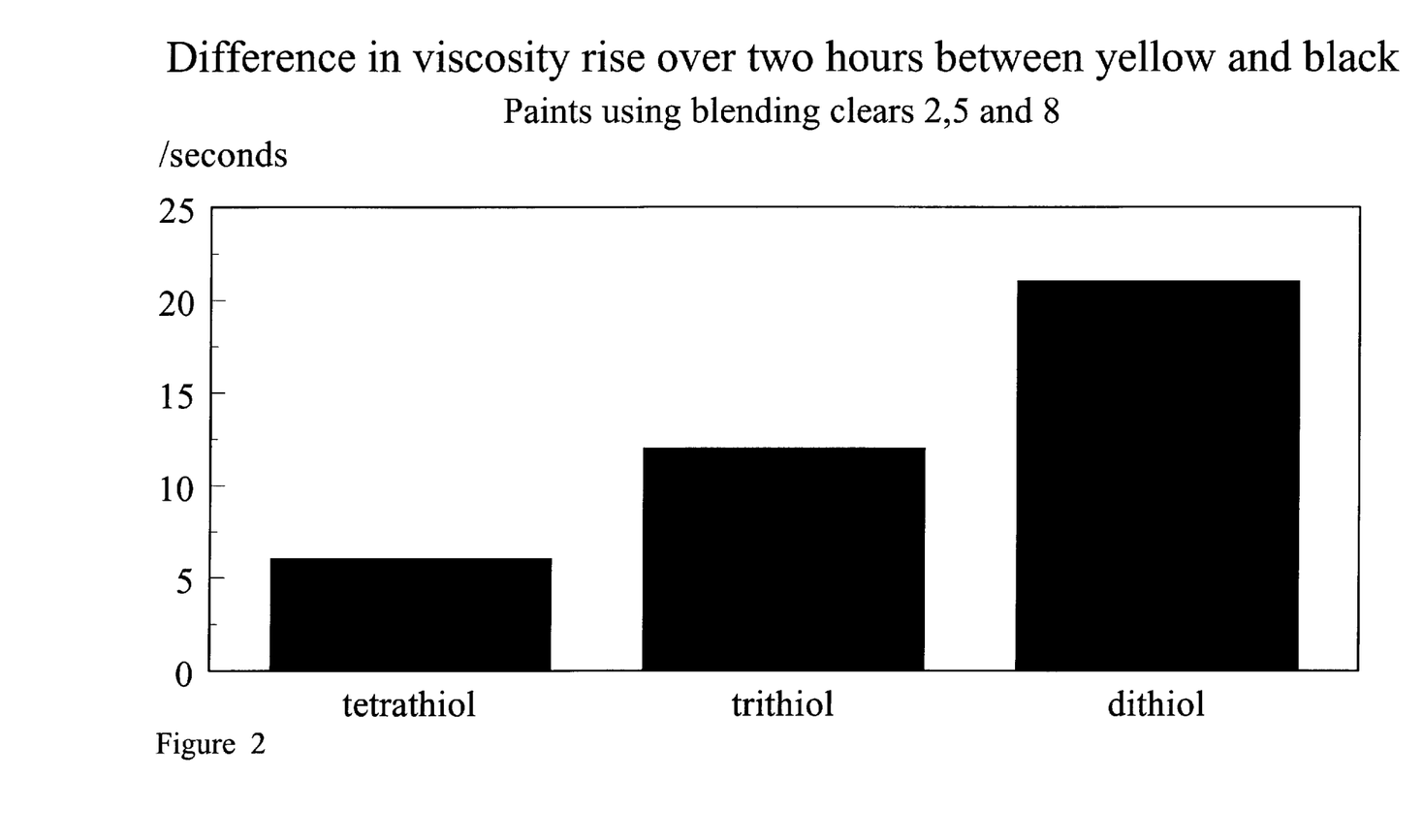
FIG. 2 is a bar graph indicating the difference in viscosity rise over 2 hours between yellow and black paints as a function of thiol catalyst functionality, in compositions with a weight ratio of tin catalyst solution to thiol of 1:2.
Figure 3:
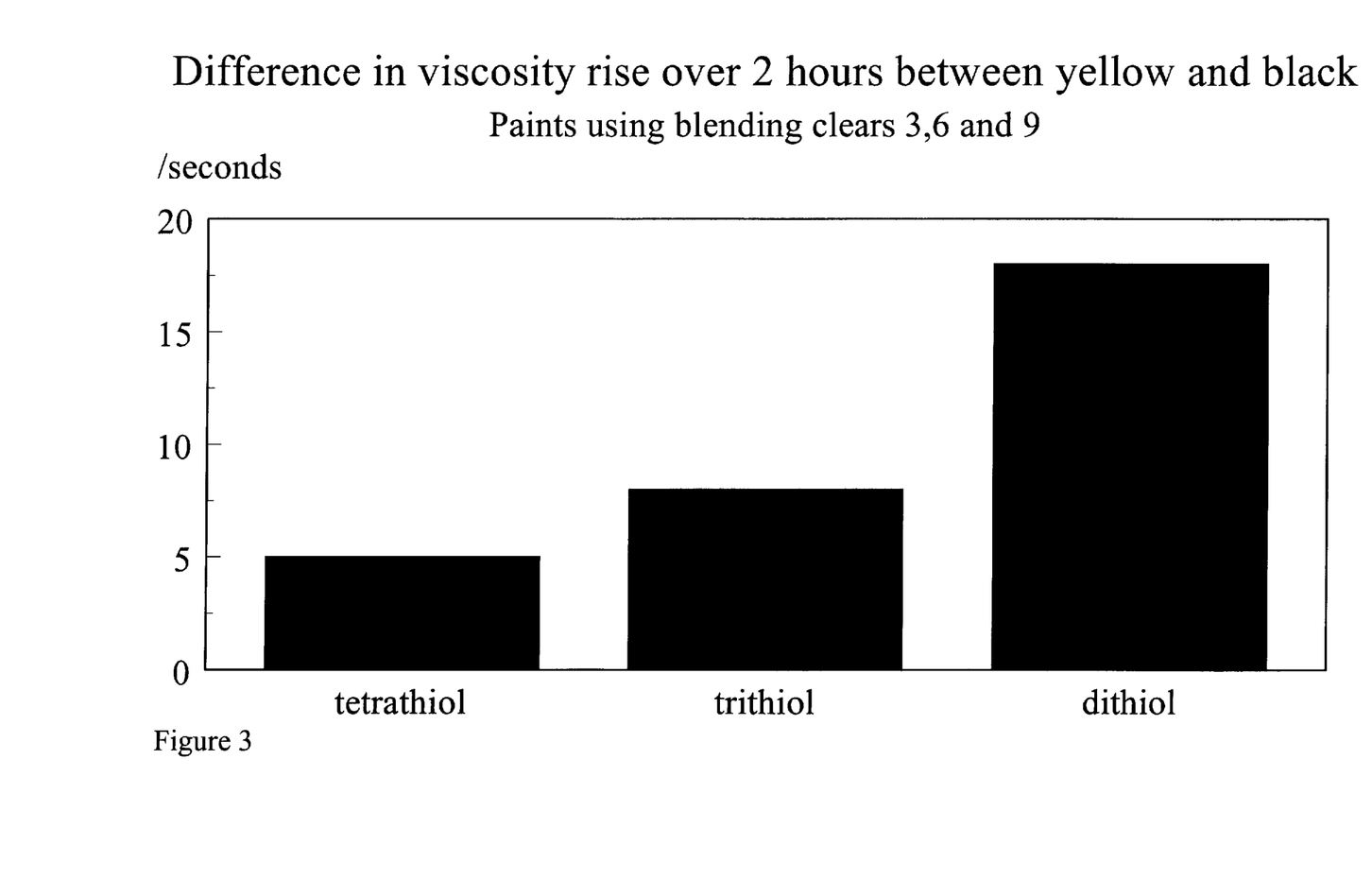
FIG. 3 is a bar graph indicating the difference in viscosity rise over 2 hours between yellow and black paints as a function of thiol catalyst functionality, in compositions with a weight ratio of tin catalyst solution to thiol of 1:3.

These results are graphically illustrated in FIGS. 1 to 3. Each figure shows a bar graph of the difference in viscosity rise, indicating pot-life, over two hours between the yellow and black paints for the compositions containing a dithiol, a trithiol and a tetrathiol. FIGS. 1, 2 and 3 compare compositions with a different ratio of tin to thiol in the catalyst. In FIG. 1 the weight ratio of the tin catalyst solution to the thiol is 3:2, in FIG. 2 it is 1:2 and in FIG. 3 it is 1:3.

It can clearly be seen from the graphs that compared to using a dithiol catalyst, the use of a trithiol catalyst about halves the difference in viscosity rise between these two colours and the use of a tetrathiol about divides the difference by three. This indicates that the use of a trithiol or tetra thiol gives a much more consistent pot-life across these two colors than the use of a dithiol.

8 Application and Testing

The compositions in the table above were applied over clean glass panels using a 175 μm block spreader. The Knoop hardness of the resulting films was measured 24 hours after application using an Erichsen Hardness Tester (Trade mark). The results are given in Table 2 below.

TABLE 2

|  | Blending Clear | Hardness |
|---|---|---|
| Yellow Paints | 1 | 53 |
|  | 2 | 57 |
|  | 3 | 47 |
|  | 4 | 48 |
|  | 5 | 45 |
|  | 6 | 45 |
|  | 7 | 47 |
|  | 8 | 44 |
|  | 9 | 48 |
| Black Paints | 1 | 38 |
|  | 2 | 48 |
|  | 3 | 47 |
|  | 4 | 51 |
|  | 5 | 45 |
|  | 6 | 55 |
|  | 7 | 55 |
|  | 8 | 54 |
|  | 9 | 47 |

9. Comparative experiments across a wider range of colors
9.1 Base paints

The base paints were made from the following components which are all commercially available from Imperial Chemical Industries Plc in their 2K and Turbo Plus mixing schemes;

a) White base paint; Diamond White, largely titanium dioxide based pigmentation.
P 425-900 759.9 g
P 420-904(RT) 34.4 g
P 420-918(RT) 36.8 g b) Green base paint; Jade Green, largely organic pigmentation.
P 425-954 312.7 g
P 425-948 67.8 g
P 425-957 45.9 g
P 425-900 149.1 g c) Orange base paint; Racing Orange, largely chrome based pigmentation.
P 425-925 717.8 g
P 425-900 17.8 g
P 425-960(RT) 57.0 g d) Blue base paint; Baliol Blue, largely organic pigmentation.
P 425-957 353.8 g
P 425-954 53.6 g P 425-900 45.4 g P 420-930 124.3 g e) Red base paint; Radiant Red, largely organic pigmentation.

P 425-941 445.6 g

P 425-925 92.0 g

P 425-900 13.3 g

P 425-921 349.1 g 9.2 Coating Compositions

The coating compositions were made by firstly mixing the colored base paints from paragraphs 3, 4 and 9.1 above with each of blending clears 3 and 9 from paragraphs 6.3 and 6.9 above in the weight ratios given in Table 3. Blending clear 3 contains a four functional tetrathiol, while comparative Blending Clear 9 contains a two functional dithiol;

TABLE 3

| Color  | Base Paint | Blending Clear |
| ------ | ---------- | -------------- |
| Yellow | 30.1       | 69.9           |
| Black  | 39.5       | 60.5           |
| White  | 28.6       | 71.4           |
| Green  | 43.2       | 56.8           |
| Orange | 31.7       | 68.3           |
| Blue   | 41.3       | 58.7           |
| Red    | 37.8       | 62.2           |

These base paint/blending clear mixtures were then mixed with the hardener from paragraph 1 above and the thinner from paragraph 2 above in the ratios shown in Table 4 below.

TABLE 4

| Color  | Blending clear/base Paint Mixture from Table 3 | Hardener from 1 above | Thinner from 2 above |
| ------ | ---- | ---- | ---- |
| Yellow | 100  | 22.1 | 18.6 |
| Black  | 100  | 25.9 | 18.6 |
| White  | 100  | 25.5 | 18.6 |
| Green  | 100  | 20.3 | 18.6 |
| Orange | 100  | 24.3 | 18.6 |
| Blue   | 100  | 20.9 | 18.6 |
| Red    | 100  | 22.2 | 18.6 |

9.3 Results

The viscosity of each composition was measured when it was first made up and then after 2 hours using a BS B4 cup in order to compare the pot-lives of the compositions. The viscosity rise (in seconds) after 2 hours in each case is shown in Table 5 below;

TABLE 5

| Color  | Compositions containing Tetrathiol | Comparative Compositions containing dithiol |
| ------ | -- | -- |
| Yellow | 8  | 26 |
| Black  | 3  | 3  |
| White  | 7  | 15 |
| Green  | 8  | 15 |
| Orange | 13 | 33 |
| Blue   | 16 | 34 |
| Red    | 14 | 28 |

Figure 4:
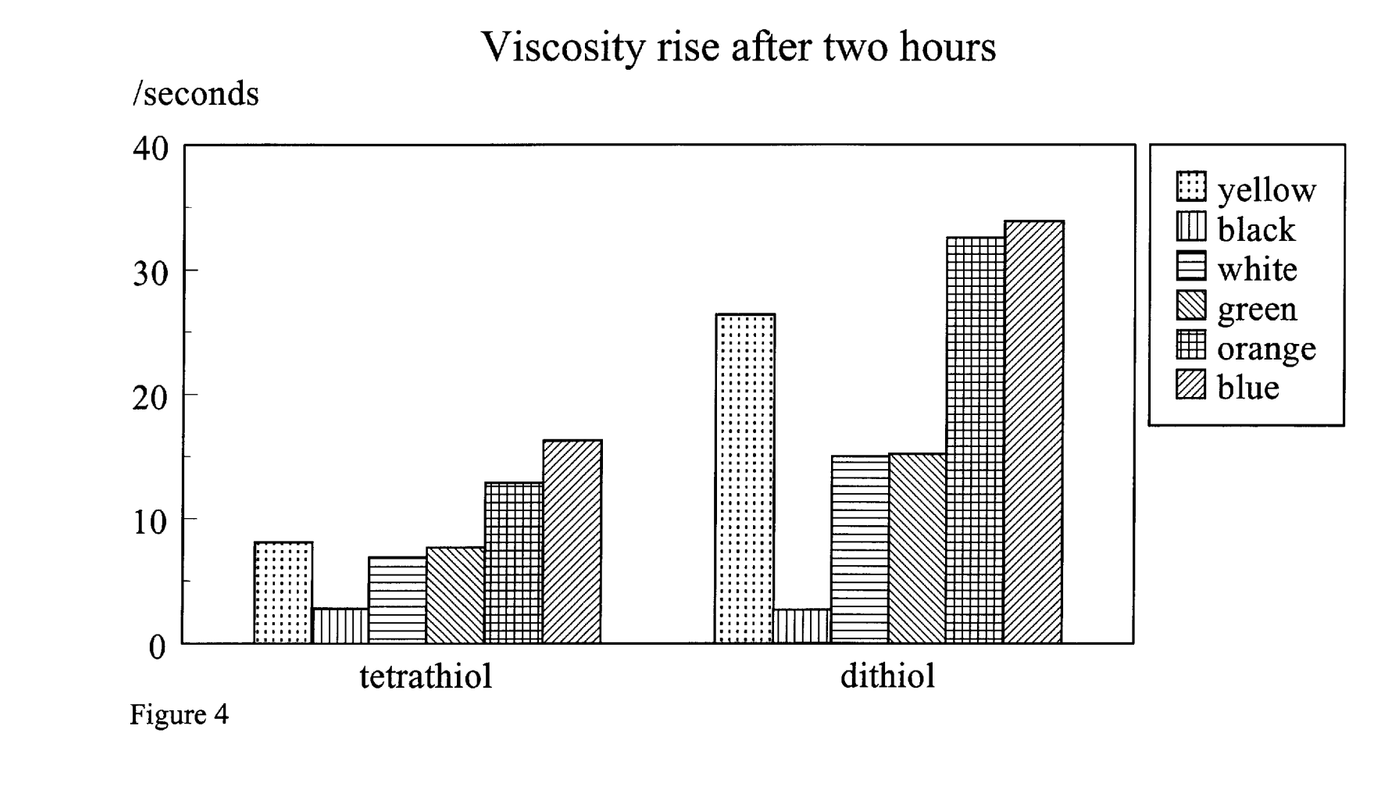
FIG. 4 is a bar graph indicating the rise in viscosity over two hours in a variety of paint colours as a function of colour and thiol catalyst functionality.

The figures from Table 5 are graphically illustrated in FIG. 4 in which the viscosity rise after two hours is plotted against paint color in a bar chart. The left hand group shows the various viscosity rises when a tetra thiol is used, while the right hand group shows the various viscosity rises when a dithiol is used. It can clearly be seen from this graph that the compositions containing a dithiol exhibit a much greater variation in viscosity rise compared with that containing a tetra thiol.

9.4. Conclusions

When a four functional tetrathiol is used as a catalyst in these compositions the maximum variation in viscosity rise after 2 hours is between the value of 3 s for the Black paint and 16 s for the Blue paint, a difference of 13 s. In contrast, the maximum variation when a two functional dithiol is used is between the value of 3 s for the Black paint and 34 s for the Blue paint, a difference of 31 s.

Thus the variation in viscosity rise is more than twice as great when a two functional dithiol is used as when a four functional tetrathiol is used. This is clearly shown in the graph of FIG. 4. This means in practice that the use of a four functional thiol gives a much more consistent pot-life across a range of colors than the use of a dithiol.

We claim:

1. A process for refinishing multiple motor vehicles with different color refinish paint, where each vehicle is painted with a pigmented refinish paint of a predetermined color, the refinish paint having reduced variability catalyzed pot life and cure time at a given catalyst level irrespective of the combination of pigments in the refinish paint, the process comprising:

selecting and mixing two or more pigmented base paints from a series of master color base paints to obtain a color paint pack, each pigmented base paint having a hydroxyl functional polymer selected from the group consisting of an acrylic addition polymer, a polyester polymer, and mixtures thereof, the hydroxyl polymer having a number average molecular weight between about 600 and 10,000, and a hydroxyl value between about 5 and 500;

adding a hardener and a catalyst mixture to the color paint pack to obtain a thermosetting refinish paint of a predetermined color, the hardener being a polyisocyanate crosslinker to react and crosslink with said hydroxyl functional polymer in each base paint the catalyst mixture being a tin catalyst and a polyfunctional thiol having at least three thiol groups, where the ratio of the number of moles of thiol groups from the polyfunctional thiol to number of moles of tin from the tin catalyst is 1:1 to 500:1, to form a catalyzed refinish paint having reduced pot-life relative to thiol catalysts having less than three thiol groups, irrespective of the pigments contained in the color paint pack:

applying a layer of the refinish paint to the surface of the motor vehicle; and causing the applied layer of refinish paint to dry and cure within a predetermined time.

2. A process according to claim 1 in which the tin catalyst is a tin mercaptide.

3. A process according to claim 1 in which the tin catalyst is added in amount of from 0.0001 to 3% by weight based on the weight of the hydroxyl functional polymer.

4. A process according to claim 1 in which the polyfunctional thiol has at least 4 thiol groups per molecule.

5. A process according to claim 1 in which the polyfunctional thiol has a thiol equivalent weight of at least 50.

6. A process according to claim 1 where the catalyst mixture is added along with an unpigmented blending clear having a hydroxyl functional polymer.

7. A process according to claim 6 in which the hydroxyl functional polymer in the blending clear is selected from the group consisting of an acrylic addition polymer, a polyester polymer and mixtures thereof.

8. A process according to claim 6 in which the hydroxyl functional polymer in the blending clear has a number average molecular weight of 600 to 10,000 as measured by gel permeation chromatography.

9. The process of claim 6 in which the hydroxyl functional polymer in the blending clear has a hydroxy value of 5 to 500.

10. The process of claim 6 in which each hydroxyl functional polymer in each of the pigmented base paints and the hydroxyl functional polymer in the blending clear each independently are acrylic addition polymers having a Fox Tg of 0° to 80° C.

11. In a process for refinishing multiple motor vehicles with different color refinish paint where each vehicle is painted with a refinish paint of a predetermined color, including the steps of, selecting and mixing two or more pigmented base paints from a series of master color base paints to obtain a color paint pack, each base paint having a hydroxyl functional polymer selected from the group consisting of an acrylic addition polymer, a polyester polymer, and mixtures thereof, the hydroxyl functional polymer having a number average molecular weight between about 600 and 10,000, and a hydroxyl value between about 5 and 500, adding a hardener and a catalyst to the color paint pack to obtain a thermosetting refinish paint of a predetermined color, the hardener being a polyisiocyanate crosslinker to react and crosslink with said hydroxyl functional polymer in each base paint, applying a layer of catalyzed refinish paint to the surface of a motor vehicle, and causing the applied layer of refinish paint to dry and cure, the improvement comprising:

adding a catalyst mixture to the color paint pack to reduce variability catalyzed pot-life, the catalyst mixture being a tin catalyst and a polyfunctional thiol having at least three thiol groups, where the ratio of moles of thiol groups from the polyfunctional thiol to the number of moles of tin from the tin catalyst is 1:1 to 500:1, to form a catalyzed refinish paint having reduced variability catalyzed pot-life relative to thiol catalysts having less than three thiol groups, irrespective of the pigments contained in the color paint pack.

* * * * *